(12) United States Patent
Imoto

(10) Patent No.: US 6,912,861 B2
(45) Date of Patent: Jul. 5, 2005

(54) VEHICLE AIR CONDITIONER

(75) Inventor: Mamoru Imoto, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/668,382

(22) Filed: Sep. 23, 2003

(65) Prior Publication Data

US 2004/0060311 A1 Apr. 1, 2004

(30) Foreign Application Priority Data

Sep. 27, 2002 (JP) ........................................ 2002-284150

(51) Int. Cl.$^7$ ................................................ B60H 1/00
(52) U.S. Cl. .......................... 62/179; 236/49.3; 165/203
(58) Field of Search .............................. 165/203, 204, 165/205, 42, 43; 62/179, 244; 236/49.3, 91 F

(56) References Cited

U.S. PATENT DOCUMENTS

| | | | |
|---|---|---|---|
| 5,803,166 A | * | 9/1998 | Ito et al. ..................... 165/203 |
| 5,937,940 A | | 8/1999 | Davis, Jr. et al. |
| 6,220,517 B1 | | 4/2001 | Ichishi et al. |
| 6,304,803 B1 | * | 10/2001 | Dao ............................ 701/36 |
| 6,390,380 B2 | | 5/2002 | Ichishi et al. |
| 6,640,890 B1 | * | 11/2003 | Dage et al. ................. 165/203 |

FOREIGN PATENT DOCUMENTS

| | | |
|---|---|---|
| EP | 0 568 826 | 11/1993 |
| JP | 8-230444 | 9/1996 |
| JP | 8-238918 | 9/1996 |
| JP | 2000-1115 | 1/2000 |

OTHER PUBLICATIONS

European Search Report dated Mar. 19, 2004 in corresponding Gt. Britain Application No. GB 0322619.8.

* cited by examiner

Primary Examiner—Harry B. Tanner
(74) Attorney, Agent, or Firm—Harness, Dickey & Pierce, PLC

(57) ABSTRACT

A vehicle air conditioner has a front air conditioning unit for front seats of a vehicle and a rear air conditioning unit for rear seats of the vehicle. The front and rear air conditioning units are controlled by an air conditioning ECU. The ECU uses a non-linear model, such as a neural network, to determine a target blowout temperature, a blower voltage, and blowout port modes of the front air conditioning unit. The ECU uses a linear model to determine a target blowout temperature, a blower voltage, and blowout port modes of the rear air conditioning unit.

5 Claims, 12 Drawing Sheets

VEHICLE AIR CONDITIONER

CROSS REFERENCE TO RELATED APPLICATIONS

This application is based on Japanese Patent Application No. 2002-284150 filed on Sep. 27, 2002, the contents of which are incorporated herein by reference.

BACKGROUND OF THE INVENTION

1. Field of the Invention

The present invention relates to a vehicle air conditioner installed in a vehicle having a front seat and a rear seat.

2. Description of Related Art

One type of conventional vehicle air conditioner includes a front air conditioning unit for front seats of a vehicle and a rear air conditioning unit for rear seats of the vehicle. The vehicle air conditioner uses a linear model to determine target blowout temperatures of the conditioned air from the front air conditioning unit and the conditioned air from the rear air conditioning unit.

The linear model has air conditioning load factors as variables, which include a set temperature, an inside air temperature, an outside air temperature, and solar radiation intensity. The set temperature is set as a desired temperature in a passenger compartment of the vehicle by the driver and a passenger. The inside air temperature in the passenger compartment is detected by an inside air temperature sensor. The outside air temperature is detected by an outside air temperature sensor. The solar radiation intensity is detected by a solar radiation sensor. The vehicle air conditioner determines its blowout port modes and blowout air quantities based on the target blowout temperatures.

A vehicle having a front row and only one rear row of seats is fitted with another type of conventional vehicle air conditioner including a front air conditioning unit for the front seats and a rear air conditioning unit for the rear seats. In order to achieve more comfort, the vehicle air conditioner uses neural networks to determine the target blowout temperatures, the blowout port modes, and the blowout air quantities of the conditioned air from the front air conditioning unit and the conditioned air from the rear air conditioning unit. The neural networks are learned by training data in advance. Air conditioning load factors such as stated above are inputted into the neural networks, which output the target blowout temperatures, the blowout port modes, and the blowout air quantities. Therefore, it is under consideration that the air conditioner installed in a vehicle having three rows of seats or relatively many rear rows of seats should be controlled by means of neural networks to achieve more comfort.

However, control by means of neural networks requires a mass storage device (ROM), and accordingly it costs more than control by means of linear models. In particular, if the air conditioner installed in a different vehicle having relatively many rear seats controls them by means of neural networks, the rear air conditioning unit for the rear seats is accordingly complex in structure, or two or more rear air conditioning units are required for the rear seats, thereby greatly increasing the cost.

SUMMARY OF THE INVENTION

An object of the present invention is to provide a vehicle air conditioner that achieves greater comfort without raising the cost.

According to one aspect of the present invention, the vehicle air conditioner includes a front air conditioning means and a rear air conditioning means. The vehicle air conditioner also includes a front air conditioning control means for determining a blowout condition of conditioned air from the front air conditioning means. The vehicle air conditioner also includes a rear air conditioning control means for determining a blowout condition of conditioned air from the rear air conditioning means. One of the front air conditioning control means and the rear air conditioning control means determines the blowout condition by means of a non-linear model. The other determines the blowout condition by means of a linear model.

Thus, the blowout condition of the conditioned air from one of the front air conditioning means and the rear air conditioning means is controlled by means of a non-linear model, while the blowout condition of the conditioned air from the other is controlled by means of a linear model. This improves a comfort of a driver and a passenger sitting in the space that is air-conditioned by means of the non-linear model in comparison with the case that both air conditioning means are controlled by means of linear models.

The control by means of a linear model enables a memory (ROM) for the control to be smaller in capacity, and makes it possible to use an air conditioning unit simpler in structure as the air conditioning means than the control by means of a non-linear model. Accordingly, by controlling one of the front air conditioning means and the rear air conditioning means by means of a linear model, it is possible to make the cost lower than by controlling both air conditioning means by means of non-linear models.

Preferably, the non-linear model may be a neural network. The use of the neural network makes it possible to finely control the blowout condition of the conditioned air so that the driver and the passenger can feel comfortable.

Preferably, the front air conditioning control means may determines the blowout condition of the conditioned air from the front air conditioning means by means of the non-linear model. The rear air conditioning control means may determines the blowout condition of the conditioned air from the rear air conditioning means by means of the linear model. This improves the comfort of the front seats on which a driver must sit and a passenger is likely to sit than the rear seat. In addition, it is possible to reduce the capacity of the memory used to control the rear air conditioning means in comparison with the control by means of a non-linear model. It is also possible to reduce the cost because the rear air conditioning means can be an air conditioning unit simple in structure.

Preferably, the front air conditioning means may independently control blowout temperatures of the conditioned air blown into a driver side space of the front space and a front passenger side space. This makes it possible to further improve the comfort of the driver and the front passenger.

Preferably, the vehicle, which is fitted with the vehicle air conditioner, has at least two rear rows of seats. In such a vehicle, if the blowout condition of the conditioned air from the rear air conditioning means is controlled by means of a non-linear model, the air conditioning means needs to be an air conditioning unit complex in structure or a plurality of air conditioning units. Therefore, by controlling the blowout condition of the conditioned air from the rear air conditioning means by means of a linear model, it is possible for the rear air conditioning means to be a single air conditioning unit simple in structure so that the cost can be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

The preferred embodiments of the present invention will be explained with reference to the accompanying drawings.

Figure 1:
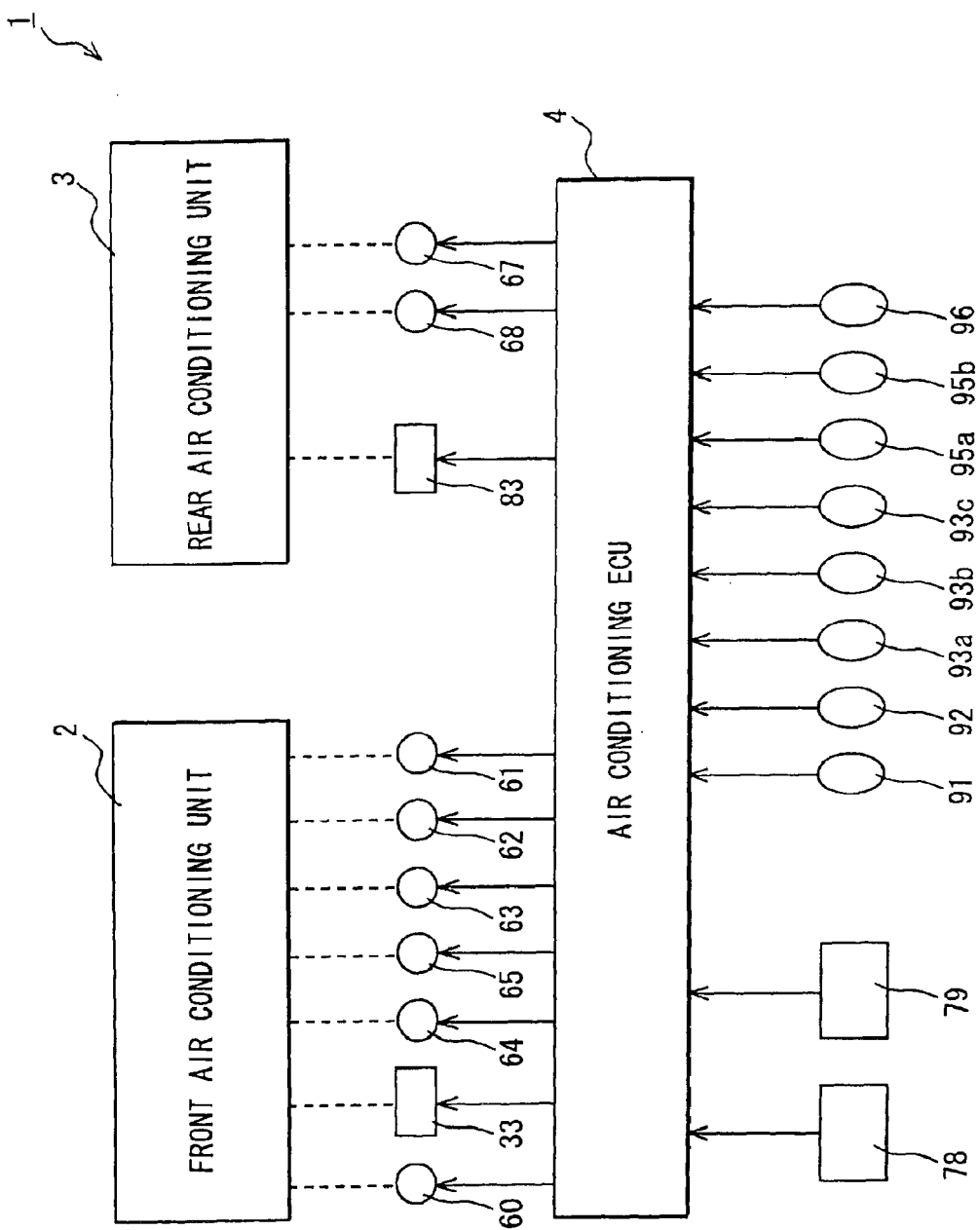
FIG. 1 is a block diagram showing the whole structure of a vehicle air conditioner according to an embodiment of the present invention.
Figure 2:
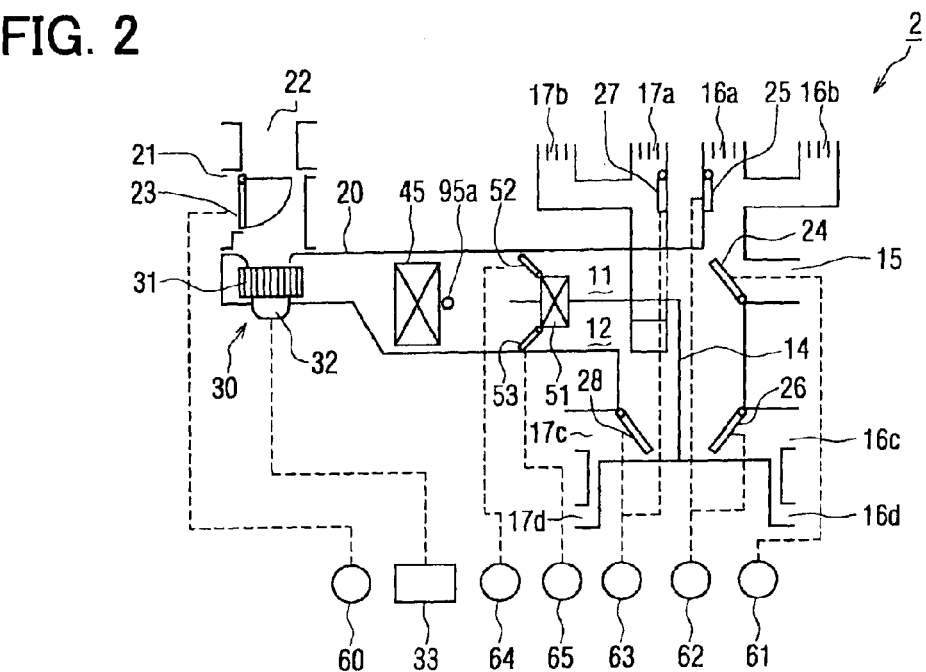
FIG. 2 is a schematic diagram showing a front air conditioning unit according to the embodiment.
Figure 3:
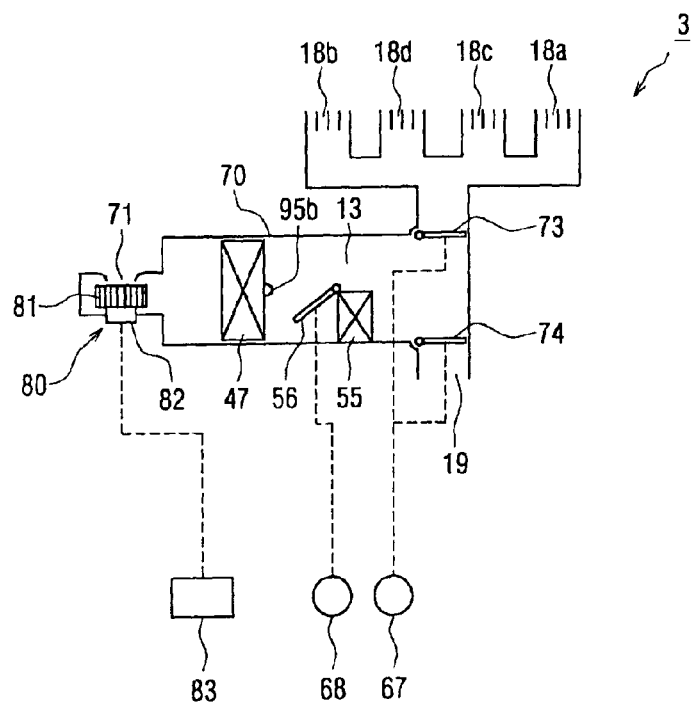
FIG. 3 is a schematic diagram showing a rear air conditioning unit according to the embodiment.

FIG. 1 shows the whole structure of a vehicle air conditioner 1 according to an embodiment of the present invention. The air conditioner 1 is installed in a vehicle having three rows of seats. A passenger compartment of the vehicle includes a driver side front air conditioning zone and a passenger side front air conditioning zone, which cover front seats, and a rear air conditioning zone, which covers rear seats. The air conditioner 1 automatically controls the temperatures of the three air conditioning zones to keep them at set temperatures. The air conditioner 1 includes a front air conditioning unit 2 for the front seats, a rear air conditioning unit 3 for the rear seats, and an air conditioning ECU 4, which controls devices of the air conditioning units 2, 3. FIG. 2 shows a structure of the front air conditioning unit 2. FIG. 3 shows a structure of the rear air conditioning unit 3.

Figure 4:
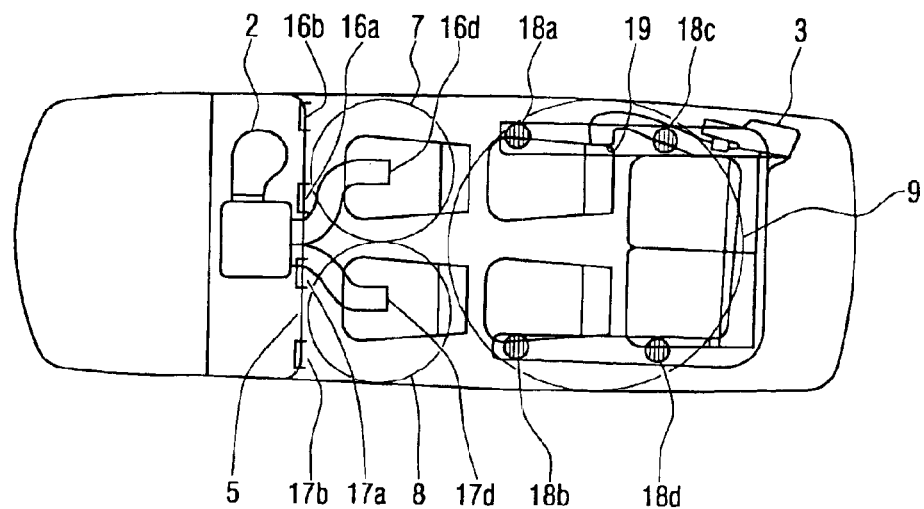
FIG. 4 is a view showing the arrangement of the front air conditioning unit and the rear air conditioning unit in the vehicle, and the three air conditioning zones in the vehicle that are air-conditioned by the units according to the embodiment.

As shown in FIG. 4, the front air conditioning unit 2 is disposed at a front side of the passenger compartment. As shown in FIG. 2, the front air conditioning unit 2 includes an air conditioning duct 20, which forms an air passage that supplies the conditioned air to the driver side front air conditioning zone and the passenger side front air conditioning zone of the passenger compartment. A centrifugal blower unit 30, for supplying air through the duct 20, is disposed in an upstream portion of the air conditioning duct 20. An inside/outside air switching box is disposed in an upstream end portion of the air conditioning duct 20. The inside/outside air switching box has an inside air suction port 21 and an external air suction port 22. An inside/outside air switching door 23 is rotatably installed inside the suction ports 21, 22. The inside/outside air switching 23 is driven by an actuator 60, such as a servomotor, to change an opening of the suction ports 21 and 22, thereby switching suction modes.

A downstream portion of the air conditioning duct 20 is divided into a first air passage 11 and a second air passage 12 by a partition plate 14. Blowout port switching boxes are disposed at the downstream end of each of the air passages 11, 12. One of the blowout port switching box of the first air passage 11 has a defroster (DEF) opening portion, a center face (FACE) opening portion, a side FACE opening portion, a foot (FOOT) opening portion, and a rear FOOT opening portion, each of which is connected to each duct.

Each of downstream ends of the ducts connected to the opening portions has a defroster (DEF) blowout port 15, a center FACE blowout port 16a on the driver side, a side FACE blowout port 16b on the driver side, a FOOT blowout port 16c on the driver side, and a rear FOOT blowout port 16d on the driver's side, respectively. The DEF blowout port 15 blows the conditioned air toward an inner surface of a windshield of the vehicle. The FACE blowout ports 16a, 16b blow the conditioned air toward the upper half of the driver's body. The FOOT blowout port 16c blows the conditioned air toward the driver's foot. The rear FOOT blowout port 16d blows the conditioned air toward the foot of the rear passengers on the driver side.

The blowout port switching box of the second air passage 12 has a center FACE opening portion, a side FACE opening portion, a FOOT opening portion, and a rear FOOT opening, each of which is connected to each duct. Each of downstream ends of the ducts connected to the opening portions has a center FACE blowout port 17a on the passenger side, a side FACE blowout port 17b on the passenger side, a FOOT blowout port 17c on the passenger side, and a rear FOOT blowout port 17d on the passenger side, respectively. The FACE blowout ports 17a, 17b blow the conditioned air toward the upper half of the front passenger's body. The FOOT blowout port 17c blows the conditioned air toward the front passenger's foot. The rear FOOT blowout port 17d blows the conditioned air toward the foot of the rear passengers on the front passenger side.

Blowout port switching doors 24 to 28 are rotatably installed inside the blowout ports 15, 16a to 16d, and 17a to 17d. The switching doors 24 to 28 are driven by other actuators 61 to 63, such as servomotors, to switch a blowout port mode, which has a FACE mode, a bi-level (B/L) mode, a FOOT mode, a foot/defroster (F/D) mode, and a DEF mode. The FACE mode is a blowout mode in which the conditioned air is blown toward the upper halves (heads and chests) of the driver and passengers.

The B/L mode is a blowout mode in which the conditioned air is blown toward the upper halves (heads and chests) and feet of the driver and the passengers. The FOOT mode is a blowout mode in which the conditioned air is blown toward the feet of the driver and the passengers. The F/D mode is a blowout mode in which the conditioned air is blown toward the feet of the driver and the passengers and the inner surface of the windshield. The DEF mode is a blowout mode in which the conditioned air is blown toward the inner surface of the windshield of the vehicle.

The blower unit 30 includes a centrifugal fan 31 and a blower motor 32. The centrifugal fan 31 is rotatably housed in a scroll case that is integral with the air conditioning duct 20. The blower motor 32 drives the centrifugal fan 31. It is possible to control the air quantity (a rotational speed of centrifugal fan 31) by controlling the voltage applied to the blower motor 32 through a blower drive circuit 33.

The air conditioning duct 20 houses an evaporator 45 of a refrigerating cycle and a heater core 51 of a cooling water circuit. The evaporator 45 is disposed at an upstream of a branch point where the air passage of the air conditioning duct 20 branches into the first air passage 11 and the second air passage 12 so that the evaporator 45 crosses an entire cross section of the air passage. The evaporator 45 cools and dehumidifies the air flowing through the air passage. The heater core 51 is disposed at a downstream of the evaporator 45 in the air conditioning duct 20 so that the heater core 51 partially covers cross sections of the first air passage 11 and the second air passage 12. The heater core 51 heats the air flowing through the air passages 11, 12.

Air mix (A/M) doors 52, 53 are rotatably installed in the first air passage 11 and the second air passage 12, respectively, near the heater core 51. The air mix doors 52, 53 are driven by other actuators 64, 65, such as servomotors, respectively. Each of the air mix doors 52, 53 adjusts ratios between the quantity of air flowing through the heater core 51 and the quantity of air bypassing the heater core 51 by their stopping positions. This independently controls the temperatures of the air blown into the driver side front air conditioning zone and the passenger side front air conditioning zone of the passenger compartment.

As shown in FIG. 3, the rear air conditioning unit 3 includes an air conditioning duct 70, which forms an air passage 13 that supplies the conditioned air to the rear air conditioning zone. A centrifugal blower unit 80, for supplying air through the duct 70, is disposed in an upstream portion of the air conditioning duct 70. An inside air suction port 71 is formed at the upstream end of the air conditioning duct 70.

A blowout port switching box is disposed at the downstream end of the air passage 13. The blowout port switching box has four FACE opening portions and a FOOT opening portion. Each of the FACE and FOOT opening portions is connected to each duct. Each of the downstream ends of the ducts connected to the opening portions has a first rear seat FACE blowout port 18a, a second rear seat FACE blowout port 18b, a third rear seat FACE blowout port 18c, a fourth FACE blowout port 18d, and a rear seat FOOT blowout port 19, respectively.

The first rear seat FACE blowout port 18a blows the conditioned air toward the upper half of the body of the passenger on the driver's side in the second row of the seats. The second rear seat FACE blowout port 18b blows the conditioned air toward the upper half of the body of the passenger on the front passenger's side in the second row of the seats. The third rear seat FACE blowout port 18c blows the conditioned air toward the upper half of the body of the passenger on the driver's side in the third row of the seats. The fourth FACE blowout port 18d blows the conditioned air toward the upper half of the body of the passenger on the front passenger's side in the third row of the seats. The rear seat FOOT blowout port 19 blows the conditioned air toward the feet of the rear passengers.

Blowout port switching doors 73, 74 are rotatably installed inside the blowout ports 18a to 18d and 19. The switching doors 73, 74 are driven by other actuator 67, such as a servomotor, to switch a blowout port mode, which has a FACE mode, a B/L mode, and a FOOT mode.

The blower unit 80 includes a centrifugal fan 81 and a blower motor 82. The centrifugal fan 81 is rotatably housed in a scroll case that is integral with the air conditioning duct 70. The blower motor 82 drives the centrifugal fan 81. It is possible to control the air quantity (a rotational speed of centrifugal fan 81) by controlling the voltage applied to the blower motor 82 through a blower drive circuit 83.

The air conditioning duct 70 houses an evaporator 47 of a refrigerating cycle and a heater core 55 of a cooling water circuit. The evaporator 47 is disposed so that the evaporator 47 crosses an entire cross section of the air passage 13 in the air conditioning duct 70. The evaporator 47 cools and dehumidifies the air flowing through the air passage 13. The heater core 55 is disposed at a downstream of the evaporator 47 in the air conditioning duct 70 so that the heater core 55 partially covers a cross section of the air passage 13. The heater core 55 heats the air flowing through the air passage 13.

An air mix (A/M) door 56 is rotatably installed in the air passage 13 near the heater core 55. The air mix door 56 is driven by another actuator 68, such as a servomotor. The air mix door 56 adjusts a ratio between the quantity of air flowing through the heater core 55 and the quantity of air bypassing the core 55 by its stopping position. This controls the temperature of the air blown into the rear air conditioning zone of the passenger compartment.

Figure 5:
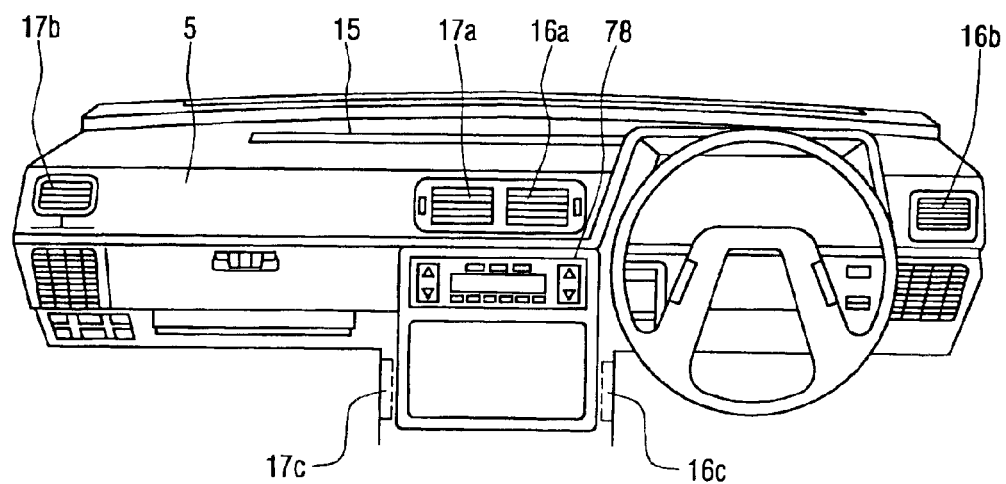
FIG. 5 is a front view showing the arrangement of the FACE blowout port and the FOOT blowout port of the front air conditioning unit in a passenger compartment of the vehicle according to the embodiment.

The front air conditioning unit 2 and the rear air conditioning unit 3 are disposed in the vehicle as shown in FIG. 4. The blowout ports 15, 16a to 16d, 17a to 17d, 18a to 18d and 19 are disposed in the passenger compartment as shown in FIGS. 4, 5. The center FACE blowout port 16a and the side FACE blowout port 16b on the driver side, and the center FACE blowout port 17a and the side FACE blowout port 17b on the front passenger side are disposed in an instrument panel 5 of the vehicle. The FOOT blowout ports 16c, 17c on the driver and passenger sides are disposed near foot areas of the driver and the front passenger, respectively.

The DEF blowout port 15 is disposed near the windshield of the vehicle. The rear FOOT blowout ports 16d, 17d on the driver and passenger sides of the front air conditioning unit 2 are disposed under the seats of the driver and the front passenger, respectively. The FACE blowout ports 18a to 18d of the rear air conditioning unit 3 are disposed in the ceiling of the passenger compartment on the outer sides of the respective rear seats. The FOOT blowout port 19 of the rear air conditioning unit 3 is disposed so that the conditioned air is blown nearly from a certain position below the rear seat on the driver side in the second row toward all foot area of the rear passengers.

The center FACE blowout port 16a, the side FACE blowout port 16b, and the FOOT blowout port 16c, which are on the driver side of the front air conditioning unit 2, blow the conditioned air mainly into the front air conditioning zone 7 on the driver side. The center FACE blowout port 17a, the side FACE blowout port 17b, and the FOOT blowout port 17c, which are on the front passenger side of the front air conditioning unit 2, blow the conditioned air mainly into the front air conditioning zone 8 on the passenger side. The rear FOOT blowout ports 16d, 17d on the driver side and the front passenger side of the front air conditioning unit 2, and the FACE blowout ports 18d to 18d and the FOOT blowout port 19 of the rear air conditioning unit 3 blow the conditioned air mainly into the rear air conditioning zone 9.

The air conditioning ECU 4 includes in it a well-known microcomputer (not shown) having a CPU, a ROM, a RAM, etc. A front air conditioner operating panel 78 for the front seats and a rear air conditioner operating panel 79 for the rear seats have switches. Various switching signals from the switches are inputted into the air conditioning ECU 4.

Figure 6A:
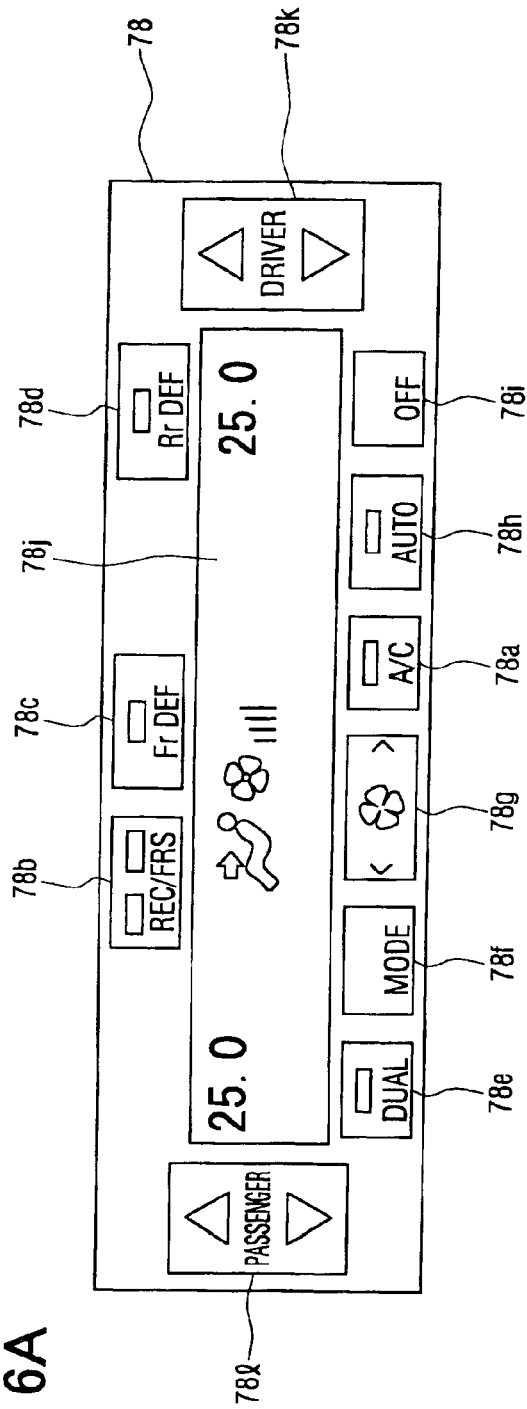
FIG. 6A is a front view showing a front air conditioner operating panel.

As shown in FIG. 5, the front air conditioner operating panel 78 is provided in the center of the front side of the instrument panel 5. As shown in FIG. 6A, it has an air conditioner (A/C) switch 78a, a suction mode switch 78b, a front defroster switch 78c, a rear defroster switch 78d, a DUAL switch 78e, a blowout port mode switch 78f, a blower air quantity switch 78g, an auto switch 78h, an off switch 78i, a liquid crystal display 78j, a temperature setting switch 78k on the driver side, a temperature setting switch 78l on the passenger side, and so on.

The DUAL switch 78e is used for instructions to independently control the temperature of each of the driver side front air conditioning zone and the passenger side front air conditioning zone. If the DUAL switch 78e is pressed for the independent temperature control, a desired temperature for the front air conditioning zone on the driver side is set by means of the temperature setting switch 78k by the driver, and a desired temperature for the front air conditioning zone on the passenger side is set by means of the temperature setting switch 78l by the driver or the passenger.

Figure 6B:
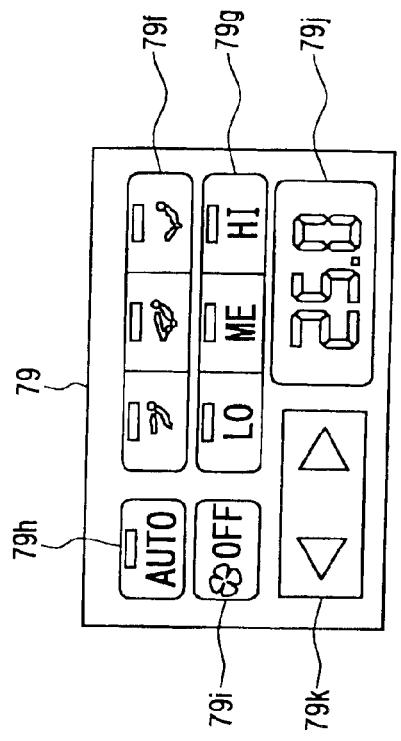
FIG. 6B is a front view showing a rear air conditioner operating panel according to the embodiment.

The rear air conditioner operating panel 79 is provided at the rear seats in the passenger compartment. As shown in FIG. 6B, the operating panel 79 has a blowout port mode switch 79f, a blower air quantity switch 79g, an auto switch 79h, an off switch 79i, a display 79j for a set temperature, a temperature setting switch 79k, and so on.

Sensor signals are inputted from various sensors into the air conditioning ECU 4. The sensors are an inside air temperature sensor 91, an outside air temperature sensor 92, a driver side solar radiation sensor 93a, a front passenger side solar radiation sensor 93b, a rear solar radiation sensor 93c, cooled and dehumidified air temperature sensors 95a and 95b, a water temperature sensor 96, a vehicle speed sensor, and so on.

The inside air temperature sensor 91 detects the temperature inside the passenger compartment. The outside air temperature sensor 92 detects the temperature (outside air temperature) outside the passenger compartment. The driver side solar radiation sensor 93a detects the quantities of solar radiation to the driver side front air conditioning zone. The front passenger side solar radiation sensor 93b detects the quantities of solar radiation to the passenger side front air conditioning zone. The rear solar radiation sensor 93c detects the quantities of solar radiation to the rear air conditioning zone.

The cooled and dehumidified air temperature sensors 95a, 95b detect the temperatures of the air having just passed through the evaporator 45 in the front air conditioning unit 2 and the air having just passed through the evaporator 47 in the rear air conditioning unit 3, respectively. The water temperature sensor 96 detects the temperatures of the cooling water flowing into the heater core 51, 55. The vehicle speed sensor detects the speed of the vehicle. The front solar radiation sensors 93a, 93b are a 2D sensor formed out of the same element. Sensed signals from the sensors 91, 92, 93a to 93c, 95a, 95b, and 96 are converted with analog-to-digital conversion into digital signals by input circuits (not shown) in the air conditioning ECU 4. Then, the digital signals are inputted into the microcomputer.

When the ignition switch of the vehicle is turned on, the air conditioning ECU 4 is activated with the direct current supplied from the battery of the vehicle. The activated ECU 4 starts to execute air conditioning control process and continues the execution until the ignition switch is turned off.

Figure 7:
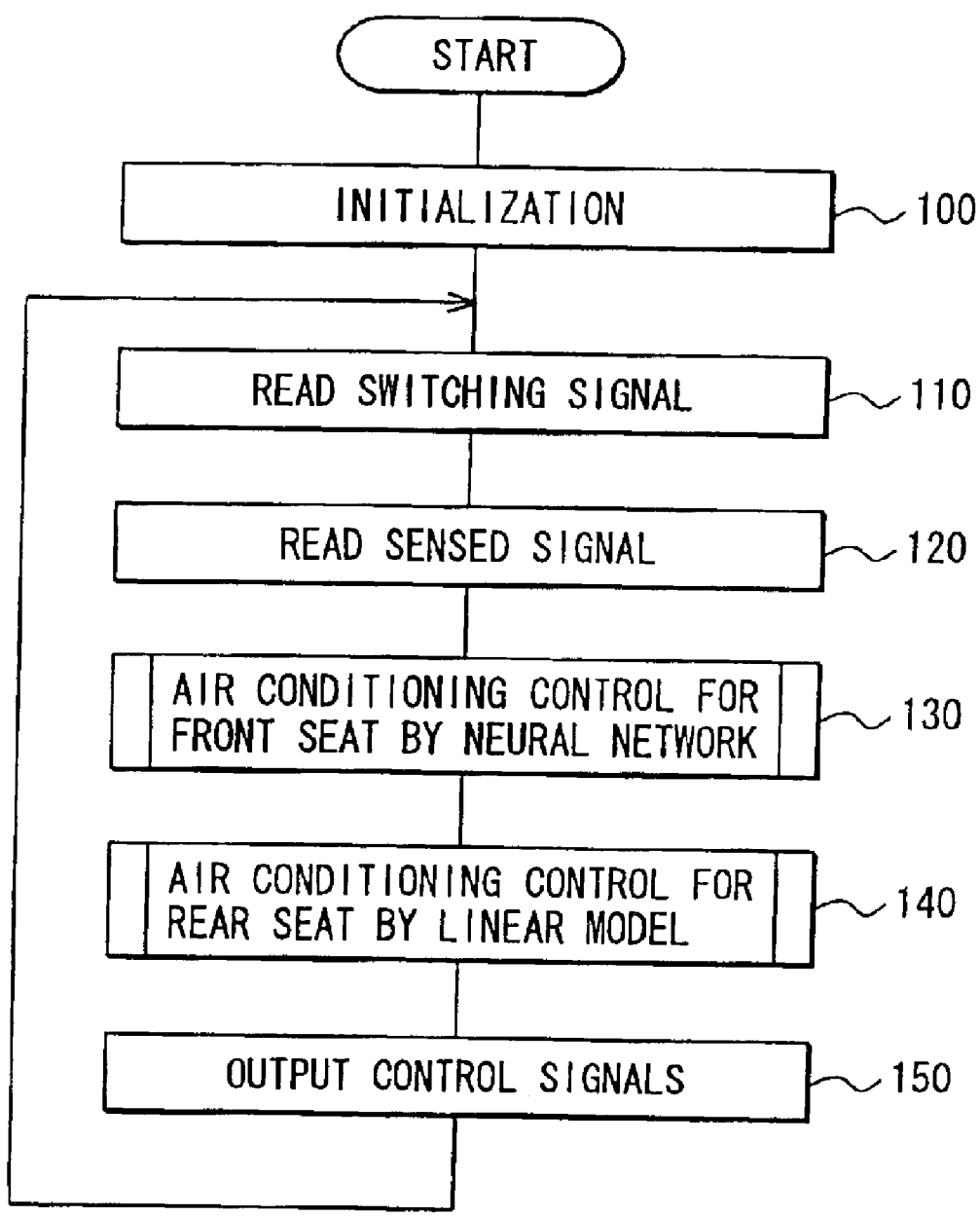
FIG. 7 is a flowchart showing an air conditioning control procedure executed by an air conditioning ECU according to the embodiment.

FIG. 7 shows a main routine of the air conditioning control process executed by the air conditioning ECU 4. Contents stored in the memory (RAM) for the data processing are initialized in a first step 100. Then, the switching signals are read from the switches 78a to 78l, and 79f to 79k in step 110. The sensed signals are read from the sensors 91, 92, 93a to 93c, 95a, 95b, and 96 in step 120. The read data are stored in the memory for data processing.

In step 130, an air conditioning control process for the front seats is executed so as to determine the target blowout temperatures of the conditioned air, the blower voltage for application to the blower motor 32, the suction mode, and the blowout port mode in the front air conditioning unit 2.

Figure 8:
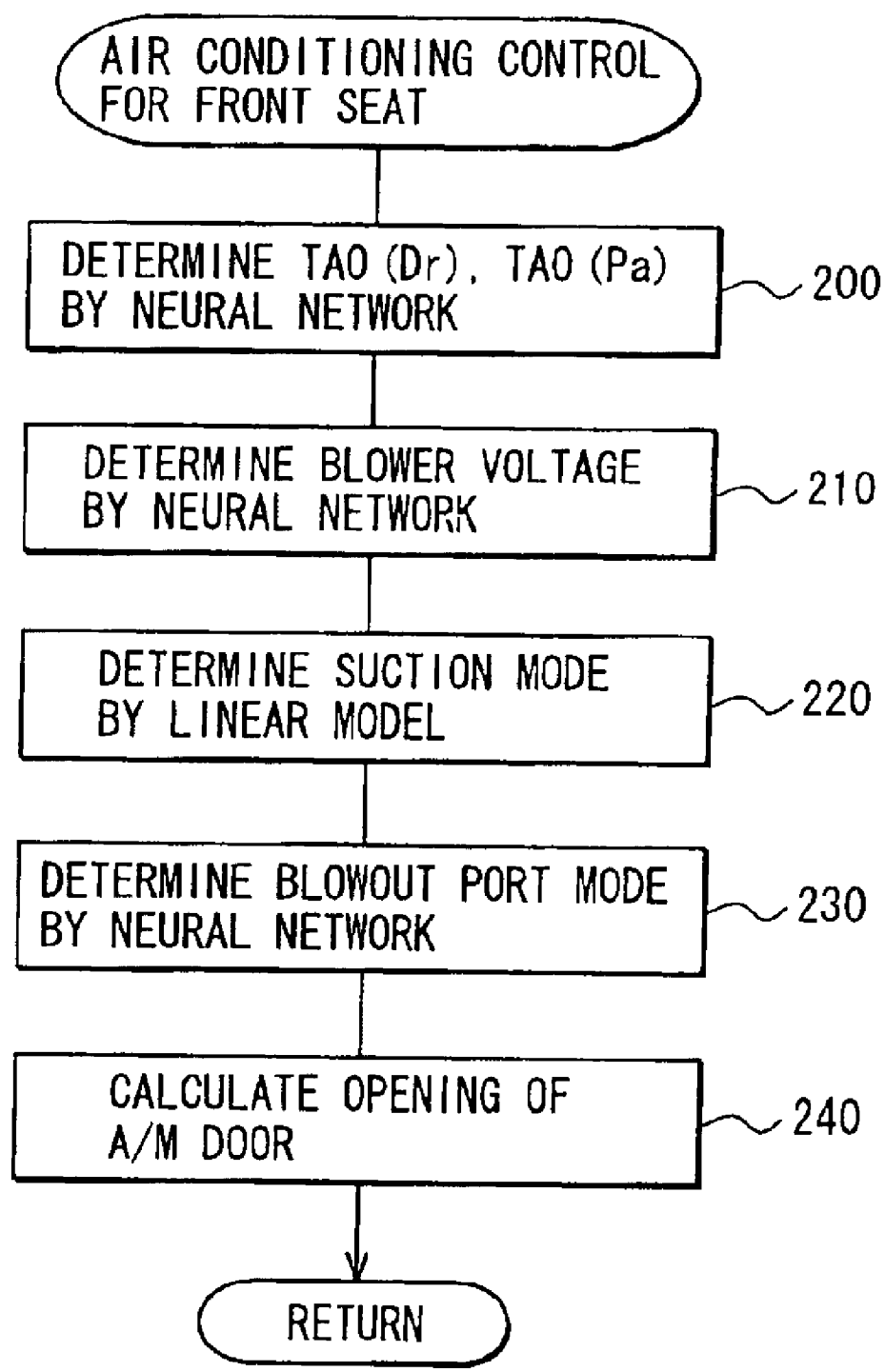
FIG. 8 is a flowchart showing the air conditioning control procedure for a front seat according to the embodiment.
Figure 9A:
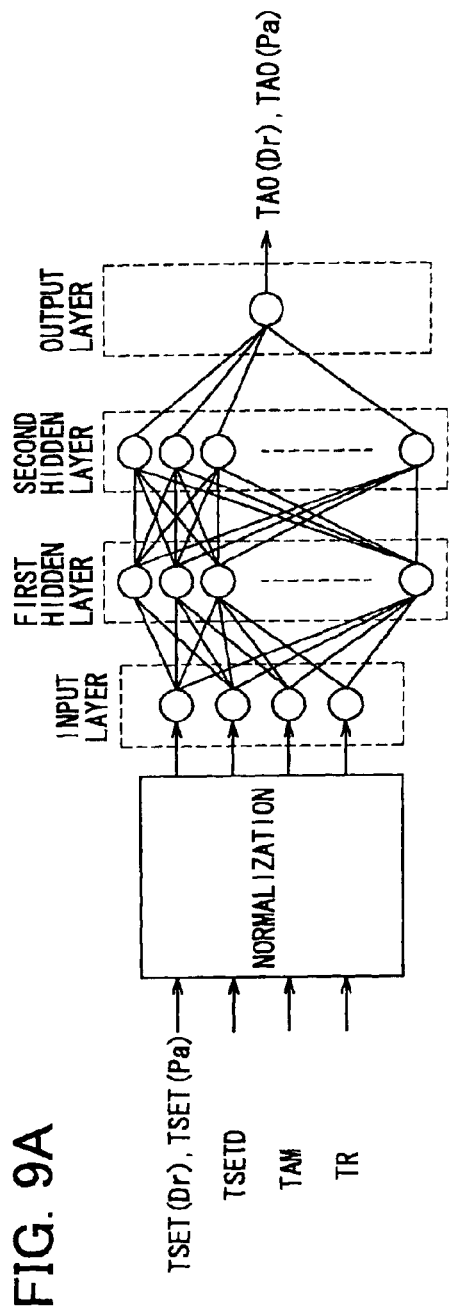
FIG. 9A is a schematic diagram showing a neural network used to calculate a target blowout temperature according to the embodiment.

FIG. 8 shows detailed processes for the air conditioning control process for the front seats. First, in step 200, the target blowout temperatures TAO(Dr) and TAO(Pa) are determined by means of the neural network shown in FIG. 9A. The TAO(Dr) is the target blowout temperature of the conditioned air blown into the front air conditioning zone on the driver side. The TAO(Pa) is the target blowout temperature of the conditioned air blown into the front air conditioning zone on the passenger side. The neural network includes a hierarchical structure that has an input layer, a first hidden layer, a second hidden layer, and an output layer.

A set temperature TSET(Dr) on the driver side and a set temperature TSET(Pa) on the front passenger side are set by the driver and the passenger by means of the temperature setting switches 78k, 78l, respectively. The outside air temperature sensor 92 detects the outside air temperature TAM. The inside air temperature sensor 91 detects the inside air temperature TR. Each of the set temperatures TSET(Dr), TSET(Pa), a difference TSETD between the set temperatures TSET(Dr), TSET(Pa), the outside air temperature TAM, and the inside air temperature TR is normalized into values between 0 and 1.

Neurons of the input layer receive the normalized values as input signals. For example, the actual inside air temperature TR detected by the inside air temperature sensor 91 ranges normally between 0° C. and 50° C. The detected value is normalized into the normalized value between 0 and 1, and the normalized value is inputted as the input signal into the input layer. Consequently, the output layer outputs a target blowout temperature as a value between 0 and 1. An inversion of the output value gives an actual value of the target blowout temperature TAO(Dr) or TAO(Pa).

Figure 10A:
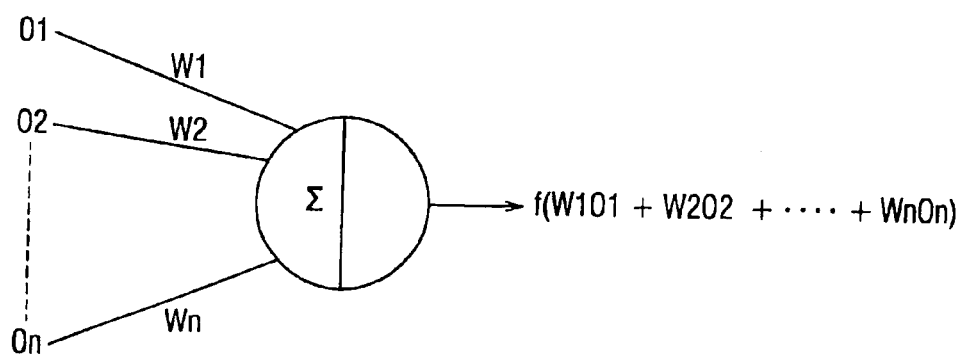
FIG. 10A is a schematic diagram showing a neuron of the neural network.
Figure 10B:
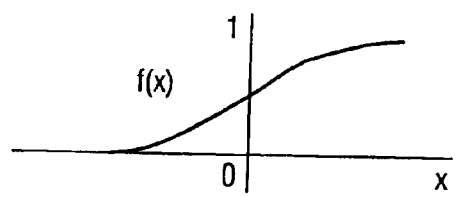
FIG. 10B is a graph showing a sigmoid function used as a transform function at the neurons of the neural network.

In the neural network, the neurons of each layer are not connected to one another. Each neuron of each layer is connected to the neurons of the adjacent layer or layers. Each of the connections is assigned a weight (synaptic load). As shown in FIG. 10A, the neurons of each layer are connected to those of the preceding layer with connection weights W1 to Wn, and receive output signals O1—On from the neurons of the preceding layer. The sum (W1O1+ W2O2+ . . . +WnOn) of the output signals inputted into the neurons of each layer is converted by a sigmoid function f as shown in FIG. 10B. The converted sum is output to the neurons of the succeeding layer.

Before the air conditioning ECU 4 is installed in the vehicle, the neural network is learned in advance as follows. First, after each connection weight is set to a suitable initial value, the weight is modified with an input value found by experiment or other means and training data that is an ideal output value associated with the input value.

Figure 9B:
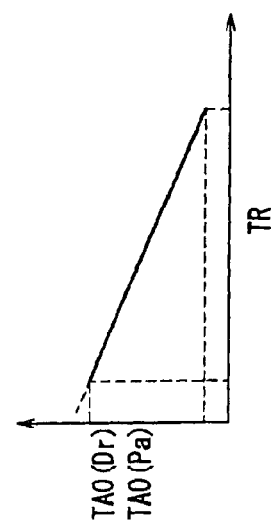
FIG. 9B is a graph showing training data that is used for learning the neural network.

FIG. 9B shows an example of the training data, which is an ideal target blowout temperature TAO(Dr) or TAO(Pa) in relation to the inside air temperature TR under a predetermined condition. The predetermined condition includes the set temperature TSET(Dr) on the driver side or the set temperature TSET(Pa) on the front passenger side=$s_1$, the difference TSETD between the set temperatures TSET(Dr) and TSET(Pa)=d, and the outside air temperature TAM=$a_1$. Some such patterns are prepared.

A set of one input value and an ideal output value associated with the input value is used as the training data. The input value of the training data is inputted into the neural network, which consequently outputs a value. The connection weight is modified with the back-propagation algorithm so that the output value is approximated to an ideal output value. If such learning is done by means of a large amount of the training data, the neural network can output the ideal value in response to the input values.

In step 200, the target blowout temperature TAO(Dr) on the driver side and the target blowout temperature TAO(Pa) on the front passenger side are determined by means of the neural network that has learned.

Figure 11A:
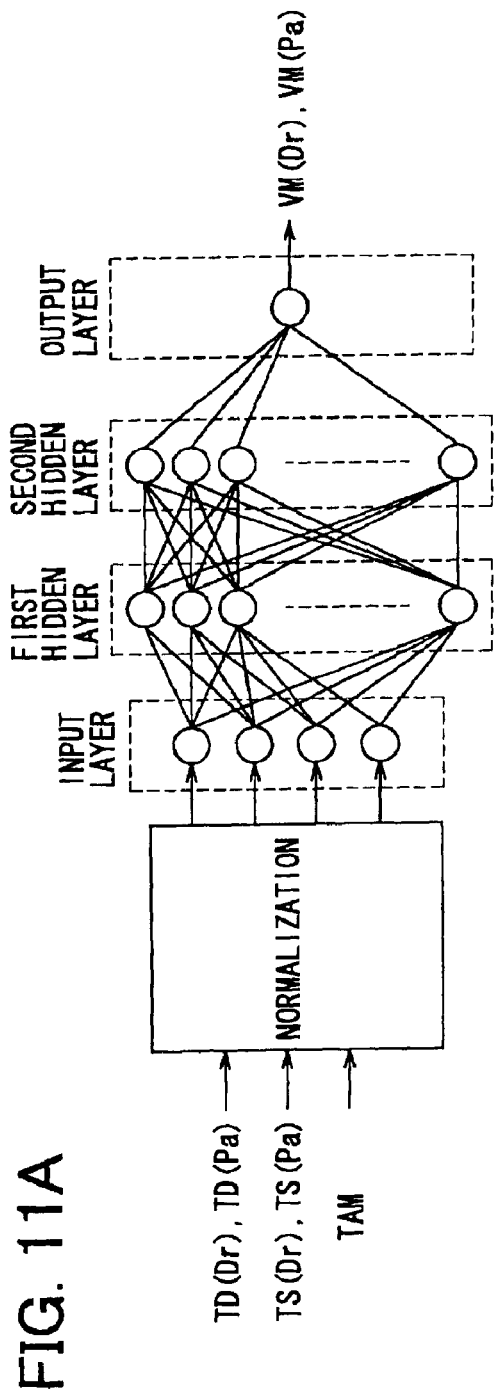
FIG. 11A is a schematic diagram showing a neural network used to calculate a blower voltage according to the embodiment.

Then, in step 210, the necessary blower voltage VM(Dr) on the driver side and the necessary blower voltage VM(Pa) on the front passenger side are determined by means of another neural network shown in FIG. 11A.

A difference value TD(Dr) is determined based on the difference between the inside air temperature TR, which is detected by the inside air temperature sensor 91, and the set temperature TSET(Dr), which is set by the driver by means of the temperature setting switch 78k. A difference value TD(Pa) is determined based on the difference between the inside air temperature TR and the set temperature TSET(Pa), which is set by the driver or the front passenger by means of the temperature setting switch 78l. The quantities of solar radiation TS(Dr), TS(Pa) are detected by the solar radiation sensors 93a, 93b, respectively. The outside air temperature TAM is detected by the outside air temperature sensor 92. The difference values TD(Dr), TD(Pa), the quantity of solar radiation TS(Dr), TS(Pa), and the outside air temperature TAM are normalized as normalized values.

Figure 11B:
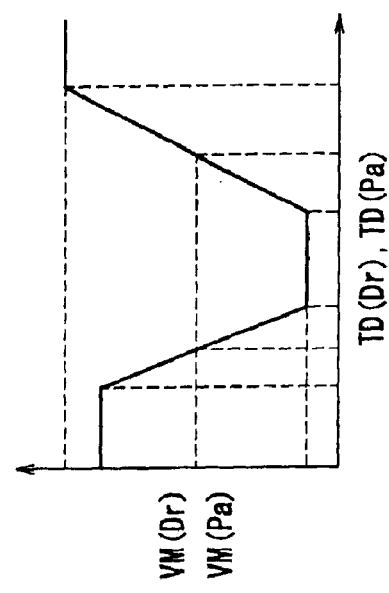
FIG. 11B is a graph showing training data that is used for learning the neural network.

The neural network receives the normalized values as input signals, and it outputs a necessary blower voltage as a value between 0 and 1. An inversion of the output value gives an actual value of the necessary blower voltage VM(Dr) and VM(Pa). The neural network is learned in advance by means of a large amount of training data. FIG. 11B shows an example of the training data. In the training data, the quantity of the solar radiation TS(Dr) or TS(Pa)=$b_1$, and the outside air temperature TAM=$a_2$.

The step 210 also includes calculating the average of the necessary blower voltages VM(Dr), VM(Pa) on the driver side and the front passenger side, which are determined by means of the neural network, and determining the average as a blower voltage BLWF for application to the blower motor 32. However, if the driver or the front passenger specifies an air quantity by means of the blower air quantity switch 78g of the front air conditioner operating panel 78, the blower voltage for the specified air quantity is determined as the blower voltage BLWF for application to the blower motor 32.

Figure 12:
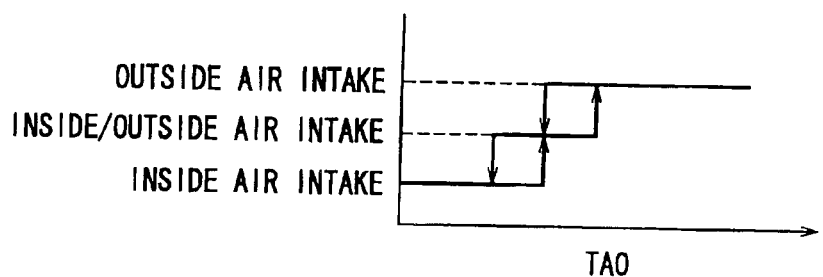
FIG. 12 is a control characteristic graph used to determine a suction mode according to the embodiment.

In step 220, the suction mode, which is an outside air intake mode, an inside and outside air intake mode, or an inside air circulation mode, is determined based on an average TAO by means of the characteristic graph (linear model) shown in FIG. 12. The average TAO is average value of the target blowout temperatures TAO(Dr) and TAO(Pa), which are determined in the step 200. However, the driver or the front passenger may select either the outside air intake mode or the inside air circulation mode by means of the suction mode switch 78b of the front air conditioner operating panel 78. In this case, the selected mode is determined as the suction mode.

Figures 13A, 13B:
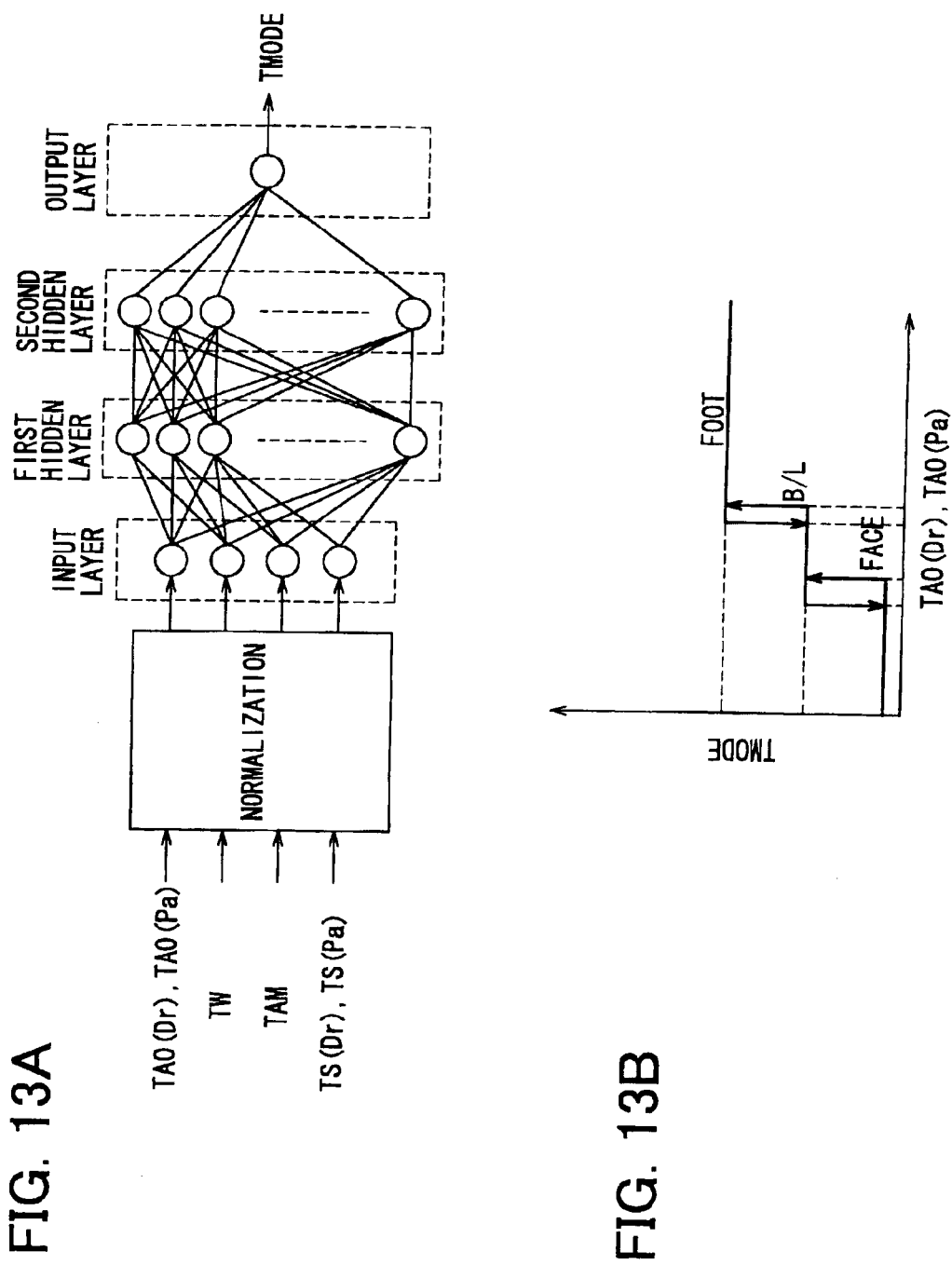
FIG. 13A is a schematic diagram showing a neural network used to determine a blowout port mode.
FIG. 13B is a graph showing training data that is used for learning the neural network.

In step 230, the blowout port mode is determined by means of the neural network shown in FIG. 13A. The target blowout temperatures TAO(Dr) and TAO(Pa) on the driver side and front passenger side respectively are found in the step 200. The cooling water temperature TW is detected by the water temperature sensor 96. The outside air temperature TAM is detected by the outside air temperature sensor 92. The quantities of solar radiation TS(Dr), TS(Pa) are detected by the solar radiation sensors 93a, 93b, respectively. The target blowout temperatures TAO(Dr), TAO(Pa), the cooling water temperature TW, the outside air temperature TAM, and the quantity of solar radiation TS(Dr), TS(Pa) are normalized.

The neural network receives the normalized values as input signals and outputs a value TMODE between 0 and 1 representing the suction mode. The blowout port mode is determined based on the value TMODE. However, the driver or the front passenger may select one of the FACE mode, the B/L mode, the FOOT mode, and the F/D mode by means of the blowout port mode switch 78f of the front air conditioner operating panel 78, or select the DEF mode by means of the front defroster switch 78c of the panel 78. In this case, the selected mode is determined as the blowout port mode. The neural network has learned in advance by means of a large amount of training data. FIG. 13B shows an example of the training data. In the training data, the cooling water temperature TW=c, the outside air temperature TAM=$a_3$, and the quantity of solar radiation TS(Dr) or TS(Pa)=$b_2$.

In step 240, the target openings SW(Dr) (%) of the A/M door 52 on the driver side, and the target openings SW(Pa) (%) of the A/M door 53 on the front passenger side are calculated, respectively. The target blowout temperatures TAO(Dr) and TAO(Pa) are found in the step 200. The temperature TE(Fr) of the air cooled and dehumidified by the evaporator 45 is detected by the air temperature sensor 95a. The cooling water temperature TW is detected by the water temperature sensor 96. The target A/M openings SW(Dr), SW(Pa) are calculated through the use of the target blowout temperatures TAO(Dr), TAO(Pa) calculated in the step 200, the cooled and dehumidified air temperature TE(Fr) detected by the air temperature sensor 95a, and the cooling water temperature TW detected by the water temperature sensor 96 based on the following numerical expressions.

$$SW(Dr)=\{TAO(Dr)-TE(Fr)\}\times 100/(TW-TE(Fr)) \quad (1)$$

$$SW(Pa)=\{TAO(Pa)-TE(Fr)\}\times 100/(TW-TE(Fr)) \quad (2)$$

After the execution of step 240 ends, the procedure returns to the main routine.

Figure 14:
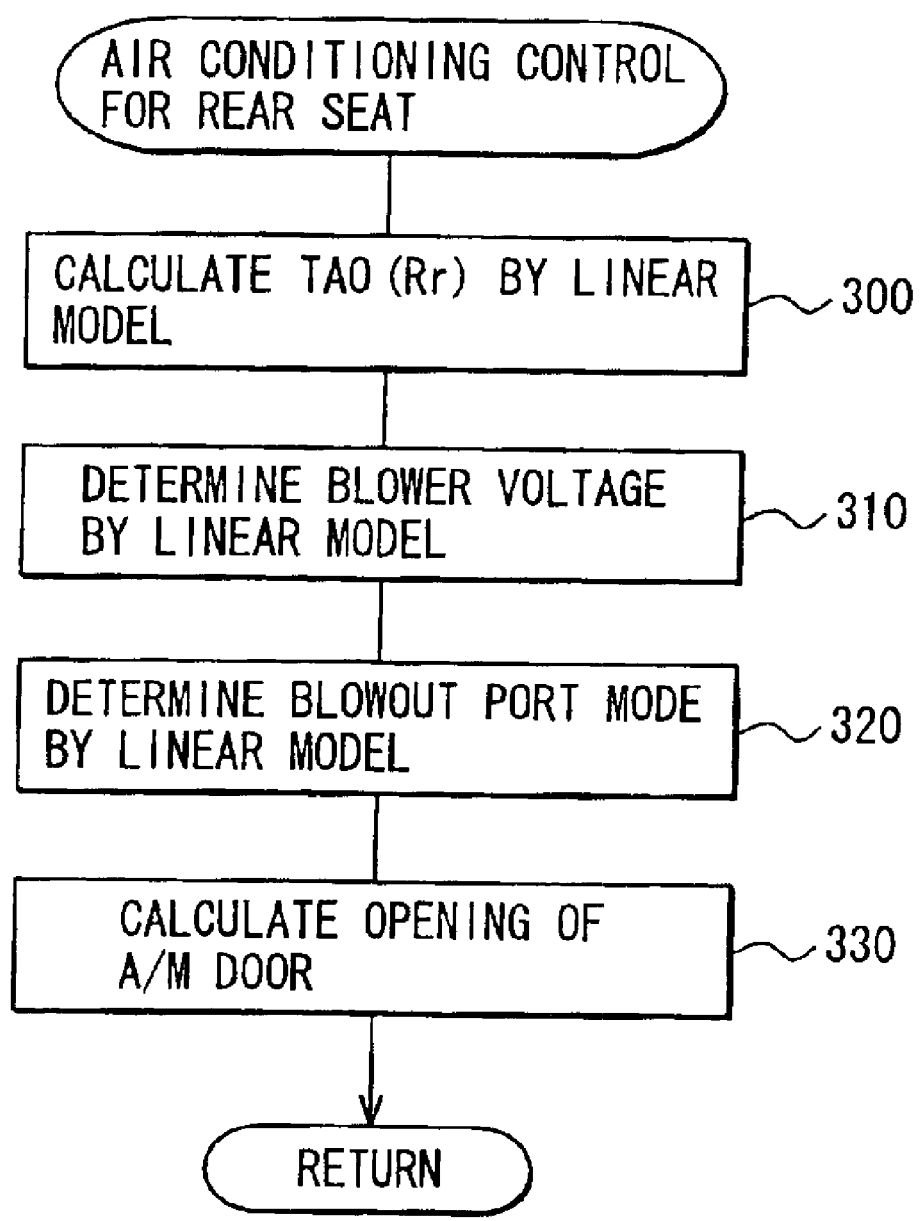
FIG. 14 is a flowchart showing an air conditioning control procedure for a rear seat according to the embodiment.

In step 140, an air conditioning process for the rear seats is executed so as to determine the target blowout temperature of conditioned air, the blower voltage for application to the blower motor 82, and the blowout port mode in the rear air conditioning unit 3. FIG. 14 shows detailed processes for the air conditioning process for the rear seats. First, in step 300, the target blowout temperature TAO(Rr) of the conditioned air blown from the rear air conditioning unit 3 is calculated based on the following numerical expression (linear model).

$$TAO(Rr)=KSET\cdot TSET(Rr)-KR\cdot TR-KAM\cdot TAM-KS\cdot TS(Rr)+C \quad (3)$$

In the expression,

TSET(Rr) is the temperature set by a passenger by means of the temperature setting switch 79k;

TS(Rr) is the quantity of solar radiation to the rear air conditioning zone 9 detected by the rear solar radiation sensor 93c;

TR is the temperature in the passenger compartment detected by the inside air temperature sensor 91;

TAM is the outside air temperature detected by the outside air temperature sensor 92;

KSET, KR, KAM, KS are a temperature setting gain, an inside air temperature gain, an outside air temperature gain, and a solar radiation quantity gain, respectively; and C is a correction constant.

Figure 15:
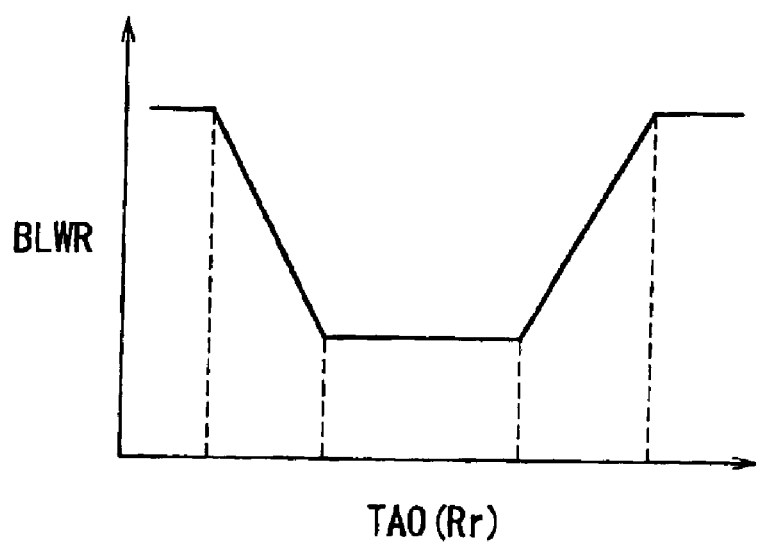
FIG. 15 is a control characteristic graph used to determine a blower voltage according to the embodiment.

In step 310, the blower voltage BLWR for application to the blower motor 82 is determined. Specifically, the blower voltage BLWR is determined by means of the characteristic graph (linear model) shown in FIG. 15 based on the target blowout temperature TAO(Rr), which is found in the step 300. However, a passenger may specify an air quantity by means of the blower air quantity switch 79g of the rear air conditioner operating panel 79. In this case, the blower voltage for the specified air quantity is determined as the blower voltage BLWR for application to the blower motor 82.

Figure 16:
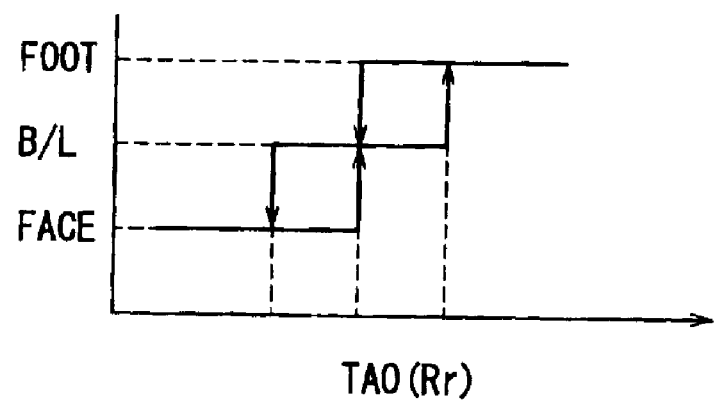
FIG. 16 is a control characteristic graph used to determine a blowout port mode according to the embodiment.

In step 320, the blowout port mode is determined by means of the characteristic graph (linear model) shown in FIG. 16 based on the target blowout temperature TAO(Rr), which is found in the step 300. Specifically, as the target blowout temperature TAO(Rr) rises from a low value, the blowout port mode changes from the FACE mode to the B/L mode and FOOT mode in that order. However, a passenger may select one of the FACE mode, the B/L mode and FOOT mode by means of the blowout port mode switch 79f of the rear air conditioner operating panel 79. In this case, the selected mode is determined as the blowout port mode.

In step 330, the target opening SW(Rr) (%) of the A/M door 56 is calculated. The target blowout temperature TAO (Rr) is found in the step 300. The temperature TE(Rr) of the air cooled and dehumidified by the evaporator 47 is detected by the cooled and dehumidified air temperature sensor 95b. The cooling water temperature TW is detected by the water temperature sensor 96. The target A/M openings SW(Dr), SW(Pa) are calculated through the use of the target blowout temperature TAO(Rr), the cooled and dehumidified air temperature TE(Rr), and the cooling water temperature TW based on the following numerical expressions.

$$SW(Rr)=\{TAO(Rr)-TE(Rr)\}\times 100/(TW-TE(Rr)) \quad (4)$$

After the execution of the step 330 ends, the procedure returns to the main routine.

In step 150 of the main routine shown in FIG. 7, control signals are sent to the blower drive circuits 33, 83 so as to apply the blower voltages BLWF, BLWR, which are determined in the steps 210, 310, to the blower motors 32, 82, respectively. The step 150 also includes sending a control signal to the actuator 60 in accordance with the suction mode determined in the step 220. The step 150 further includes sending control signals to the actuators 61 to 63 and 67 in accordance with the blowout port modes determined in the steps 230 and 320. The step 150 further includes sending control signals to the actuators 64, 65 and 68 in accordance with the A/M openings SW(Dr), SW(Pa) and SW(Rr), which are determined in the steps 240 and 330. Thereafter, the main routine returns to the step 110 and repeats the steps 110 to 150.

Thus, in this embodiment, the front air conditioning unit 2 is a bilaterally (right and left) independent temperature control type, which is controlled by means of neural networks. This enables the air conditioning unit 2 to improve the comfort of the drive seat, on which the driver must sit, and the front passenger seat, on which a passenger is likely to sit than the rear seats, in comparison with another unit. Another unit is an air conditioning unit that controls conditioned air blown into right and left air conditioning zones so that the air blown into each of the zones has the same temperature, or is controlled by means of linear models. The blowout condition of the conditioned air from the rear air conditioning unit 3 is controlled by means of linear models. This enables the air conditioning unit 3 to be simple in structure. This also enables the memory (ROM) for the control to be small, thereby preventing the cost from rising.

The front air conditioning unit 2 corresponds to the front air conditioning means of the present invention. The rear air conditioning unit 3 corresponds to the rear air conditioning means of the present invention. The inside air temperature sensor 91, the outside air temperature sensor 92, the solar radiation sensors 93a to 93c, the water temperature sensor 96, and the temperature setting switches 78k, 78l and 79k of the air conditioner operating panels 78, 79 correspond to the air conditioning load sensing means of the present invention. The step 130 of the air conditioning control processing executed by the air conditioning ECU 4 corresponds to the front air conditioning control means of the present invention, and the step 140 corresponds to the rear air conditioning control means of the present invention.

The present invention should not be limited to the embodiments discussed above and shown in the figures, but may be implemented in various ways without departing from the spirit of the invention.

For example, in the foregoing embodiment, the target blowout temperatures TAO(Dr), TAO(Pa) on the driver side and the front passenger side are determined based on the set temperatures TSET(Dr), TSET(Pa), the inside air temperature TR, and the outside air temperature TAM. Likewise, the target blowout temperature TAO(Rr) on the rear passengers side is determined based on the set temperatures TSET(Rr), the quantity of solar radiation TS(Rr), the inside air temperature TR, and the outside air temperature TAM. However, the target blowout temperatures TAO(Dr), TAO (Pa), and TAO(Rr) on the driver side, the front passenger side, and the rear passengers side, respectively, might also be determined based on the vehicle speed, the number of passengers, and so on, in addition to the prescribed factor. Thus, if more sensor signals were used to determine the target blowout temperatures, finer control would be possible so that the driver and the passengers could feel more comfortable, although the memory (ROM) would require a larger capacity, particularly for control by means of neural networks as is the case with the front air conditioning unit 2.

Two inside air temperature sensors corresponding to the driver side front air conditioning zone and the passenger side front air conditioning zone might be provided to detect the temperatures TR(Dr), TR(Pa) of both zone. The temperatures TR(Dr) and TR(Pa) could be used as the basis for calculating the target blowout temperatures TAO(Dr), TAO (Pa), and the necessary blower voltages VA(Dr), VA(Pa).

In this case, an inside air temperature TR(Rr) for determining the target blowout temperature of the rear air conditioning unit 3 might be derived from the inside air temperatures TR(Dr), TR(Pa) on the driver side and the front passenger side. Alternatively, another inside air temperature sensor might be provided to sense the temperature of the rear air conditioning zone. Thus, the inside air temperature sensors might be provided in each air conditioning zone. The values detected by the sensors could be used to control the each air conditioning zone so as to further improve the comfort of the driver and the passengers in each zone.

In the foregoing embodiment, the front air conditioning unit 2 and the rear air conditioning unit 3 are independently controlled. Alternatively, information, such as the target blowout temperatures found by means of the neural network to control the front air conditioning unit 2, might be used to correct the target blowout temperature calculated by means of the linear model to control the rear air conditioning unit 3. This could improve the comfort of the rear passengers without raising the cost for controlling the rear air conditioning unit 3.

In the foregoing embodiment, the single blower unit 30 blows the conditioned air for the FACE blowout ports 16a, 16b, 17a, and 17b for the front seats. Alternatively, two blower units might be provided for the FACE blowout ports. One of the blower units could independently control the quantity of the conditioned air blown from the FACE blowout ports 16a, 16b on the driver side. The other blower unit could independently control the quantity of the conditioned air blown from the FACE blowout ports 17a, 17b on the front passenger side.

The provision of the two blower units for each front air conditioning zone makes it possible to apply the necessary blower voltages VA(Dr), VA(Pa) on the driver side and the front passenger side as the blower voltages for application to the blower motors on each side directly without averaging them. The necessary blower voltages VA(Dr), VA(Pa) are determined by means of the neural network in the step 210. This makes it possible to more properly control the quantity of the conditioned air blown into each of the front air conditioning zones.

In the foregoing embodiment, the air conditioning ECU 4 uses the neural networks to control the front air conditioning unit 2. Alternatively, the air conditioning ECU 4 might use different models other than the neural networks as far as the different models are non-linear models that can finely control the blowout condition of conditioned air. For example, the air conditioning unit 2 might be controlled by means of non-linear models that are combinations of neural networks and a fuzzy system.

In the foregoing embodiment, the conditioned air only from the first air passage 11 is blown from the DEF blowout port 15 in the front air conditioning unit 2. Alternatively, the conditioned air from the first air passage 11 might be blown from the half of this port 15 on the driver side, while conditioned air from the second air passage 12 might be blown from the half of this port 15 on the front passenger side.

In the foregoing embodiment, the front air conditioning unit 2 is the bilaterally independent temperature control type, which makes it possible to independently set the blowout temperature of the conditioned air blown into each of the front air conditioning zones. Alternatively, the air conditioning unit 2 might blow the conditioned air at the same temperature into both air conditioning zones.

In the foregoing embodiment, the present invention is applied to a vehicle having three rows of seats. Alternatively, the invention may be applied to a vehicle having two rows of seats.

In the foregoing embodiment, the front air conditioning unit 2 is controlled by means of the non-linear models, while the rear air conditioning unit 3 is controlled by means of the linear models. However, it may be strongly required to control comfortably the rear seats than the front seats. In this case, the front air conditioning unit 2 might be controlled by means of linear models, while the rear air conditioning unit 3 might be controlled by means of non-linear models.

What is claimed is:

1. A vehicle air conditioner comprising:

front air conditioning means for blowing conditioned air toward a front space covering a front seat in a passenger compartment of a vehicle;

rear air conditioning means for blowing conditioned air toward a rear space covering a rear seat in the passenger compartment;

air conditioning load sensing means for detecting load values corresponding to a plurality of air conditioning load factors in the vehicle;

front air conditioning control means for determining a blowout condition of the conditioned air from the front air conditioning means based on the load values; and rear air conditioning control means for determining a blowout condition of the conditioned air from the rear air conditioning means based on the load values;

wherein the front air conditioning control means determines the correspondent blowout condition by means of a neural network that represents a relation between the air conditioning load factors and a target blowout condition, the relation being learned by training data; and the rear air conditioning control means determines the correspondent blowout condition by means of a linear model that represents a relation between the air conditioning load factors and a target blowout condition.

2. The vehicle air conditioner according to claim 1, wherein the front air conditioning means independently adjust a blowout temperature of conditioned air blown into a driver side space of the front space and a blowout temperature of conditioned air blown into a front passenger side space of the front space, and the front air conditioning control means independently controls the blowout temperatures of the conditioned air blown from the front air conditioning means into the driver side space and the conditioned air blown from the front air conditioning means into the front passenger side space.

3. The vehicle air conditioner according to claim 1, wherein the rear seat has at least two rows of seats.

4. The vehicle air conditioner according to claim 1, wherein the neural network represents at least a relation between a difference of a temperature set by a passenger of the vehicle from a temperature in the passenger compartment and a target blowout temperature.

5. The vehicle air conditioner according to claim 1, wherein the neural network incorporates a fuzzy system therein.

* * * * *